United States Patent
Chang et al.

(10) Patent No.: US 11,310,075 B2
(45) Date of Patent: Apr. 19, 2022

(54) ASYMMETRIC DUPLEX TRANSMISSION DEVICE AND SWITCHING SYSTEM THEREOF

(71) Applicant: ATEN International Co., Ltd., New Taipei (TW)

(72) Inventors: Tsu-mu Chang, Taipei (TW); Yung-yi Chang, Taipei (TW); Ying-chen Chen, New Taipei (TW)

(73) Assignee: ATEN International Co., Ltd., New Taipei (TW)

( * ) Notice: Subject to any disclaimer, the term of this patent is extended or adjusted under 35 U.S.C. 154(b) by 762 days.

(21) Appl. No.: 14/539,960

(22) Filed: Nov. 12, 2014

(65) Prior Publication Data

US 2015/0288510 A1 Oct. 8, 2015

Related U.S. Application Data

(60) Provisional application No. 61/974,179, filed on Apr. 2, 2014.

(30) Foreign Application Priority Data

Jul. 4, 2014 (TW) .................................. 103123175

(51) Int. Cl.
*H04L 12/00* (2006.01)
*H04L 12/403* (2006.01)
(Continued)

(52) U.S. Cl.
CPC ........ *H04L 12/4035* (2013.01); *H04J 3/0697* (2013.01); *H04L 5/14* (2013.01); *H04L 7/0008* (2013.01)

(58) Field of Classification Search
CPC ....... H04L 7/0008; H04L 7/033; H04L 25/14; H04L 7/0012; H04L 7/10; H04L 12/4035;
(Continued)

(56) References Cited

U.S. PATENT DOCUMENTS 7,072,355 B2 * 7/2006 Kizer ..................... H03M 9/00
370/250
7,295,578 B1 * 11/2007 Lyle .......................... G06F 3/14
348/473
(Continued)

FOREIGN PATENT DOCUMENTS

CN 102023945 A 4/2011
TW I411956 10/2013
(Continued)

OTHER PUBLICATIONS

European Search Report in counterpart application EP 15152544.1, dated Sep. 11, 2015.
(Continued)

*Primary Examiner* — Noel R Beharry
*Assistant Examiner* — Lionel Preval
(74) *Attorney, Agent, or Firm* — Chen Yoshimura LLP

(57) ABSTRACT

The present invention provides an asymmetric duplex transmission device and a switching system employing the same. The master device and the slave device communicate with each other through a single clock and full duplex data channels. It can also switch the duplex data channels between a plurality of slave devices under limited resources.

18 Claims, 6 Drawing Sheets

(51) Int. Cl.
   *H04L 7/00* (2006.01)
   *H04J 3/06* (2006.01)
   *H04L 5/14* (2006.01)

(58) Field of Classification Search
   CPC ......... H04L 5/14; H04J 3/0697; H04J 3/0635;
   H04J 3/0638; H04N 21/4305
   USPC ............. 370/294, 463, 474; 714/2; 341/100;
   348/473
   See application file for complete search history.

(56) References Cited

U.S. PATENT DOCUMENTS

| | | | | |
|---|---|---|---|---|
| 2001/0038387 | A1* | 11/2001 | Tomooka | G09G 3/3644 |
| | | | | 345/520 |
| 2005/0041683 | A1* | 2/2005 | Kizer | H03M 9/00 |
| | | | | 370/463 |
| 2005/0231399 | A1* | 10/2005 | Fowler | H03M 9/00 |
| | | | | 341/100 |
| 2008/0022144 | A1* | 1/2008 | Shibata | G06F 1/3203 |
| | | | | 713/502 |
| 2008/0151792 | A1 | 6/2008 | Taich et al. | |
| 2009/0290599 | A1* | 11/2009 | Taki | H04L 12/4633 |
| | | | | 370/474 |
| 2010/0169704 | A1* | 7/2010 | Yu | G06F 1/12 |
| | | | | 714/2 |
| 2011/0072297 | A1 | 3/2011 | Huang | |
| 2011/0090102 | A1 | 4/2011 | Brodt et al. | |
| 2011/0316596 | A1 | 12/2011 | Schultz | |
| 2013/0329828 | A1 | 12/2013 | Lee et al. | |
| 2014/0107997 | A1* | 4/2014 | Li | G06F 17/5009 |
| | | | | 703/13 |
| 2014/0143585 | A1* | 5/2014 | Barakat | G06F 5/065 |
| | | | | 713/503 |

FOREIGN PATENT DOCUMENTS

TW    I424731    1/2014
TW    201408043 A    2/2014

OTHER PUBLICATIONS

Taiwanese Office Action, dated Oct. 7, 2015, in a counterpart Taiwanese patent application, No. TW 103123175.
Chinese Office Action, dated Jun. 16, 2017, and Search Report dated Jun. 7, 2017, in a counterpart Chinese patent application, No. CN 201410794560.9.
Chinese Office Action, dated Dec. 13, 2017, in a counterpart Chinese patent application, No. CN 201410794560.9.

* cited by examiner

ASYMMETRIC DUPLEX TRANSMISSION DEVICE AND SWITCHING SYSTEM THEREOF

BACKGROUND OF THE INVENTION

1. Field of the Invention

The present invention relates to a duplex transmission device, and more particularly to an asymmetric duplex transmission device and a switching system thereof.

2. Description of the Prior Art

Please refer to FIG. 1, which illustrates a conventional architecture of symmetric duplex transmission. The architecture comprises a master device 180, and a plurality of slave devices 190, and 195 electrically coupled to the master device 180. The master device 180 further comprises an oscillator 99, a plurality of phase lock loops (PLL) 21, 40 and 41, a plurality of transmission modules 30, 31, 50, and 51, and a plurality of receiving modules 32, 33, 52, and 53. The slave device 190 comprises receiving modules 60 and 61, transmission modules 62 and 63, and a PLL 22, wherein the receiving module 60 is coupled to the transmission module 30 through a first transmission medium 110, the receiving module 61 is coupled to the transmission module 31 through the second transmission medium 111, the transmission module 62 is coupled to the receiving module 32 through a third transmission medium 112, and the transmission module 63 is coupled to the receiving module 33 through a fourth transmission medium 113. Likewise, the slave device 195 comprises receiving modules 70 and 71, transmission modules 72 and 73, and a PLL 23, wherein the receiving module 70 is coupled to the transmission module 50 through a first transmission medium 160, the receiving module 71 is coupled to the transmission module 51 through the second transmission medium 161, the transmission module 72 is coupled to the receiving module 52 through a third transmission medium 162, and the transmission module 73 is coupled to the receiving module 53 through a fourth transmission medium 163.

In the master device 180, the oscillator 99 generates an oscillating signal to the PLL 21 such that the PLL 21 can generate a first clock information 320. The transmission modules 30 and 50 respectively receive the clock information 320 and respectively generate a forward clock (a clock signal to be transmitted in the forward direction, i.e. from the master to the slave) corresponding to the first clock information. The forward clock generated from the transmission modules 30 and 50 are respectively transmitted to the receiving modules 60 and 70 through the first transmission medium 110 and 160. The transmission modules 31 and 51 receive the first clock information 320 and forward data (data to be transmitted in the forward direction) and respectively transmit the forward data to the receiving modules 61 and 71 through the second transmission medium 111 and 161.

In the slave devices 190 and 195, the PLL 22 and 23 respectively receive the forward clock from the receiving modules 60 and 70 thereby generating a second clock information 220 corresponding to the received forward clock. The receiving modules 61 and 71 respectively receive the forward data through the second transmission medium 111 and 161 according to the second clock information 220. In addition, the transmission modules 62 and 72 receive backward data (data to be transmitted in the backward direction, i.e. from the slave to the master) and the second clock information, and transmit the backward data to the receiving module 32 and 52 through the third transmission medium, respectively. Similarly, the transmission modules 63 and 73 respectively receive the second clock information, and generate a backward clock (clock signal to be transmitted in the backward direction) corresponding to the second clock information. The backward clocks are further transmitted to the receiving modules 33 and 53 through the fourth transmission medium.

The PLLs 40 and 41 respectively receive the backward clock transmitted from the receiving modules 33 and 53 and respectively generate a third clock information, which is further transmitted to the receiving modules 32 and 52 so that the receiving modules 32 and 52 can receive the backward data through the third medium 112 and 162 according to the third clock information.

Conventionally, a matrix system having a plurality of I/O in the master-slave architecture can be implemented by a chip such as application-specific integrated circuit (ASIC) or a field-programmable gate array (FPGA) for controlling the full duplex data transmission. However, when the FPGA is utilized as a control chip in the matrix system, the quantities of input/output of the matrix system will be limited because the FPGA is a standard chip that has a limited resources such as quantities of PLL. For example, when it comes to a matrix system such as 16 (in)×16 (out) matrix system, it is necessary to arrange 32 PLLs within the master device formed by a FPGA; however, it will be hard to find FPGA having sufficient quantities of PLLs. Even if there exists such kind of FPGA, the cost will be very expensive to develop the master device.

Alternatively, ASIC is another choice for being implemented within the master-slave architecture for the matrix system. It is well-known that the ASIC is a customized chip that can include a plurality of resources according to the need of designer. Even if the user can design the ASIC layout by arranging enough PLLs in the chip, the cost will be expensive as well as the package size of the chip will be increased.

SUMMARY OF THE INVENTION

In order to solve the problem of the conventional architecture, there is a need and focus in the related industry to provide an asymmetric duplex transmission device and switching system.

Accordingly, one aspect of the present invention provides an asymmetric duplex transmission device, comprising a master device and at least one slave device. The master device comprises a first phase lock loop (PLL) electrically coupled to a master transceiver module, the slave device is electrically coupled to the master device and comprises a slave transceiver module. The master transceiver module transmits a forward clock to the slave transceiver module through a first transmission medium, transmits a forward data to the slave transceiver module through a second transmission medium, and receives a backward data transmitted from the slave transceiver module through a third transmission medium; wherein the first PLL provides a first clock that is used when transmitting the forward clock and the forward data to the at least one slave device and when receiving the backward data from the at least one slave device.

Another aspect of the present invention provides a switching system employing an asymmetric duplex transmission device, comprising a master device and at least one slave device coupled to the master device. The master device comprises: a first PLL; at least one packet generator, each packet generator outputs at least one package data; a matrix switching module coupled to at least one packet generator, the matrix switching module transmits at least one data stream to at least one packet generator for converting to at least one package data; and at least one master transceiver module coupled to the first PLL and at least one packet generator, each master transceiver module converts at least one package data to a forward data. Each slave device is respectively coupled to one of the master transceiver modules, each slave device has a slave transceiver module; wherein the master transceiver module transmits a forward clock to the slave transceiver module through a first transmission medium, transmits a forward data to the slave transceiver module through a second transmission medium for converting the forward data to at least one package data, and receives a backward data transmitted from the slave transceiver module through a third transmission medium. The first PLL provides a first clock that is used when transmitting the forward clock and the forward data to the at least one slave device and when receiving the backward data from the at least one slave device.

DETAILED DESCRIPTION OF THE PREFERRED EMBODIMENT

Figure 1:
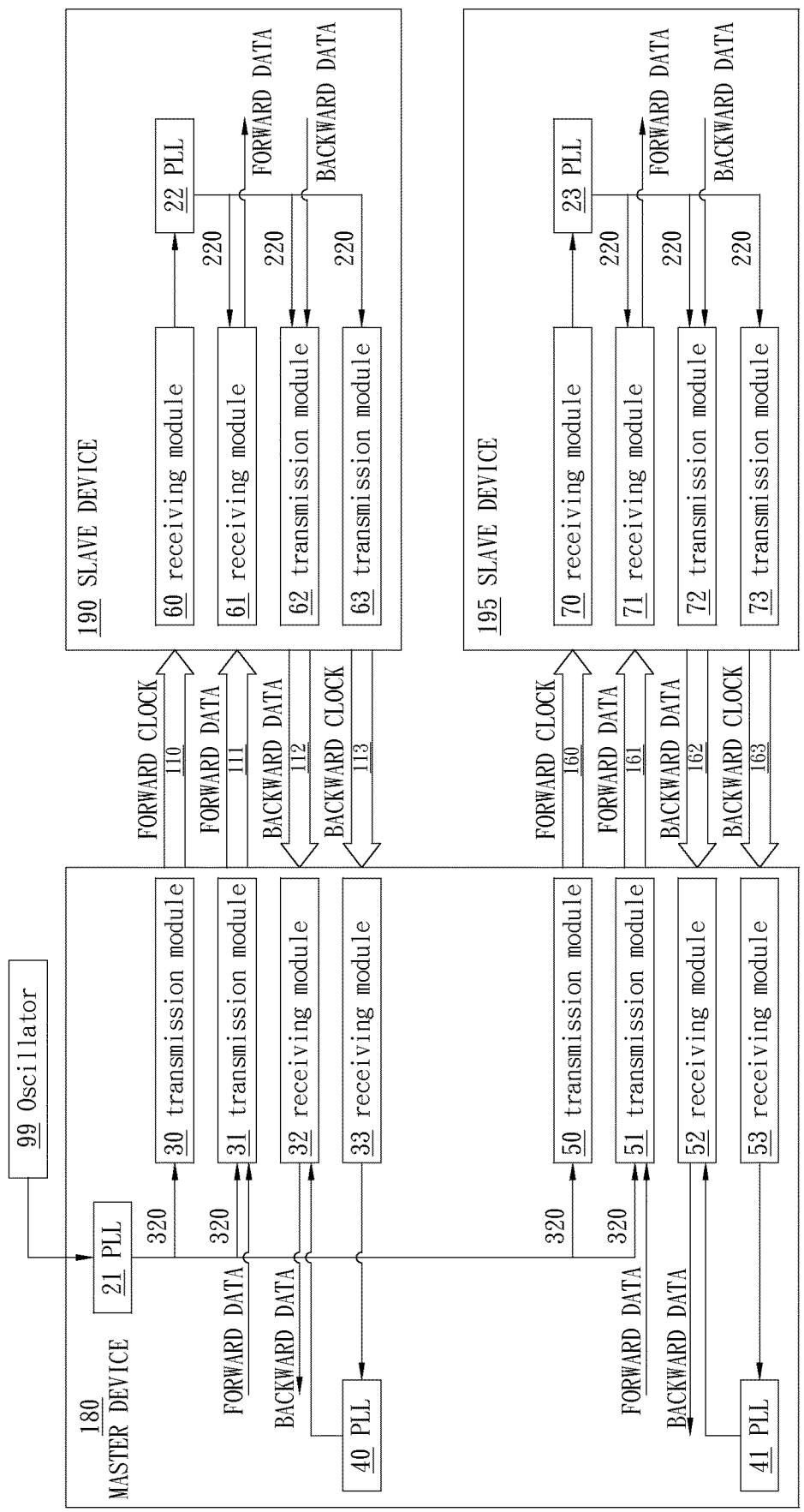
FIG. 1 illustrates a conventional architecture of the duplex transmission.
Figure 2:
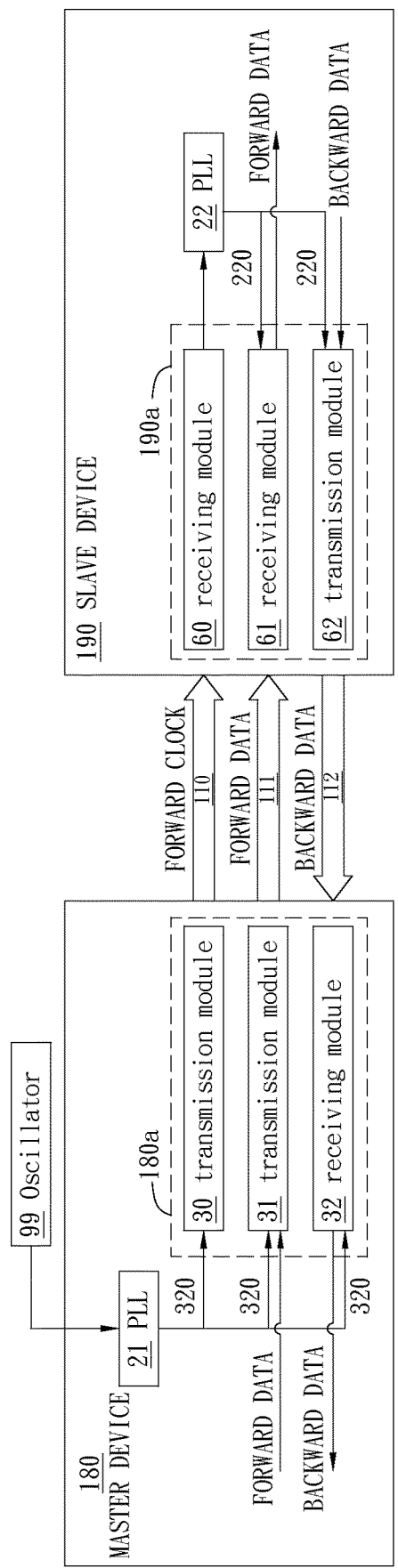
FIG. 2 illustrates a block diagram of the architecture of asymmetric duplex transmission according to one embodiment of the present invention.

Please refer to FIG. 2, which illustrates a block diagram of the architecture of asymmetric duplex transmission device according to the first embodiment of the present invention. The asymmetric duplex transmission device can be, but should not be limited, to be adapted to signal extender, such as KVM extender, video extender and so on. In the present invention, the master device 180 is coupled to the slave device 190. It is noted that, in the present embodiment, although there is only shown one slave device 190, alternatively, the master device 180 can be coupled to a plurality of slave devices as well. In addition, the master device 180 and the slave device 190 can be arranged separately on the same circuit board; or, alternatively, the can be integrated together to be arranged on the same circuit board. In an alternative embodiment, the master device 180 and slave device 190 can be respectively formed on a separately circuit board, and coupled to each other through medium including, but not should be limited to, twisted wires, connectors, gold fingers or flexible circuit boards.

The master device 180 comprises a first phase lock loop (PLL) 21 coupled to a master transceiver module 180a, and an oscillator 99 coupled to the first PLL 21. The slave device 190, in one embodiment, comprising a second PLL 22 coupled to a slave transceiver module 190a. The master transceiver module 180a comprises a first transmission module 30, a second transmission module 31 and a first receiving module 32. The slave transceiver module 190a comprises a second receiving module 60, a third receiving module 61 and a third transmission module 62. The first transmission module 30 is electrically coupled to the second receiving module 60 through a first transmission medium 110, the second transmission module 31 is electrically coupled to the third receiving module 61 through a second transmission medium 111, and the first receiving module 32 is electrically coupled to the third transmission module 62 through a third transmission medium 112. The transmission medium mentioned above could include, but should not be limited to, the twisted wires, connectors, gold fingers or flexible circuit boards.

The first PLL 21 generates a first clock 320 according to a clock signal generated from the oscillator 99 and transmits the first clock 320 to the first transmission module 30, the second transmission module 31 and the first receiving module 32 in the master transceiver module 180a. The first transmission module 30 transmits a forward clock to the second receiving module 60 through the first transmission medium 110. The second transmission module 31 transmits a forward data to the third receiving module 61 through the second transmission medium 111. The second PLL 22 in the slave device 190 generates a second clock 220 according to the received forward clock from the second receiving module 60 and transmits the second clock 220 to the third receiving module 61 and the third transmission module 62. The third transmission module 62 receives the second clock 220 from the second PLL 22 and a backward data, and transmits the backward data to the first receiving module 32. It is noted that each of the forward data, forward clock and the backward data is a differential signal, such as Low Voltage Differential Signaling (LVDS). In addition, each of the first transmission modules 30, the second transmission module 31 and the third transmission module 62 performs as a serializer for converting parallel data into a serial data while each of the first receiving modules 32, the second receiving module 60, and the third receiving module 61 performs as a deserializer to convert serial data into a parallel data.

According to the architecture in this embodiment, the first transmission modules 30, the second transmission module 31 and the first receiving module 32 arranged within the master device 180 share the same first PLL 21, so there is no need to transmit a backward clock from the slave device 190 to the master device 180 while transmitting the backward data from the third transmission module 62 to the first receiving module 32. In short, the first PLL 21 provides the clock, i.e. the first clock 320, that is used when the master device 180 transmits the forward clock, the forward data and receives the backward data. Accordingly, a receiving module in the master device 180 for receiving the backward clock from the slave device 190 can be omitted whereby the resource consumption of the master device 180, and complexity of circuit layout can be reduced thereby saving the cost and time requirement of development.

In alternative embodiments, the forward data and backward data can be, but should not be limited to, a non-video data, such as control data, audio data, or the combination thereof. The control data can be, but should not be limited to, IR data stream, Universal Asynchronous Receiver/Transmitter (UART) stream, or the combination thereof.

Figure 3A:
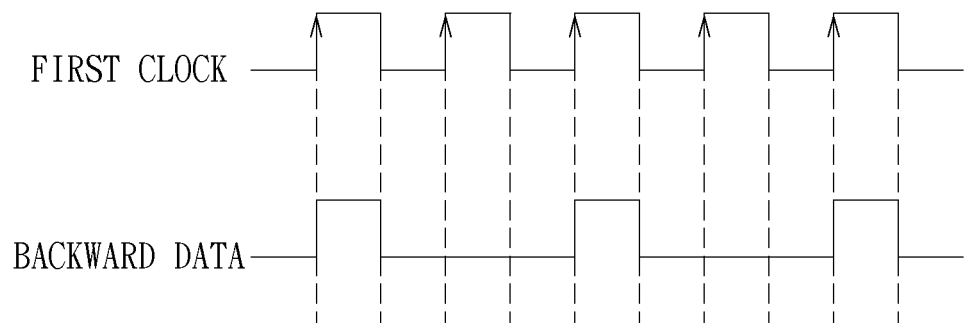
FIGS. 3A and 3B illustrate schematic diagrams of the phase adjustment procedure according to one embodiment of the present invention.
Figure 3B:
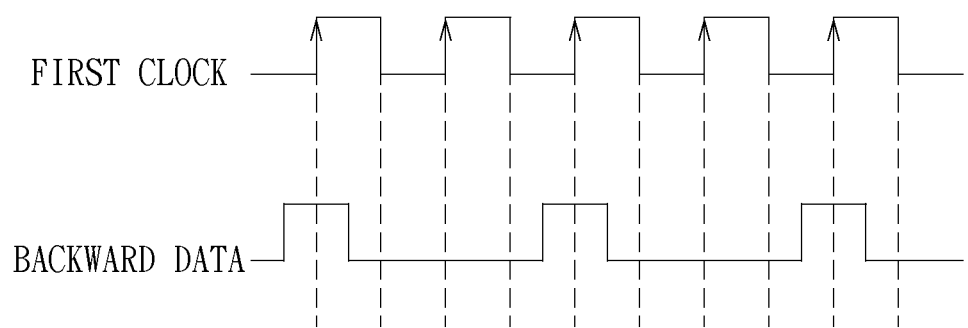

It is noted that since there is no need to transmit a backward clock from the slave device 190 to master device 180 while transmitting the backward data, in the practical situation, there will be a phase shift between the pulse of the first clock 320 provided by the first PLL 21 and the pulse of the backward data. As shown in FIG. 3A, there illustrates a relationship between the first clock and the pulse of the backward data. During the transmission of backward data from slave device 190 to master device 180, the phase will be shifted such that the rising edge of the first clock may be the same as or closing to the rising edge of the backward data so that the master device 180 probably cannot determine whether it receives the backward data. However, according to the architecture in the present invention, a phase adjustment procedure is performed to automatically shift the phase of the backward data according to the phase of the first clock signal. As shown in FIG. 3B, the rising edge of the first clock is adjusted to correspond to a position near the center of the high level of the backward data thereby ensuring that the first receiving module 32 correctly receives the backward data from the third transmission module 62. The implementation of phase adjustment is well known by the one having ordinary in the art, which will not be described in detail hereinafter.

Figure 4:
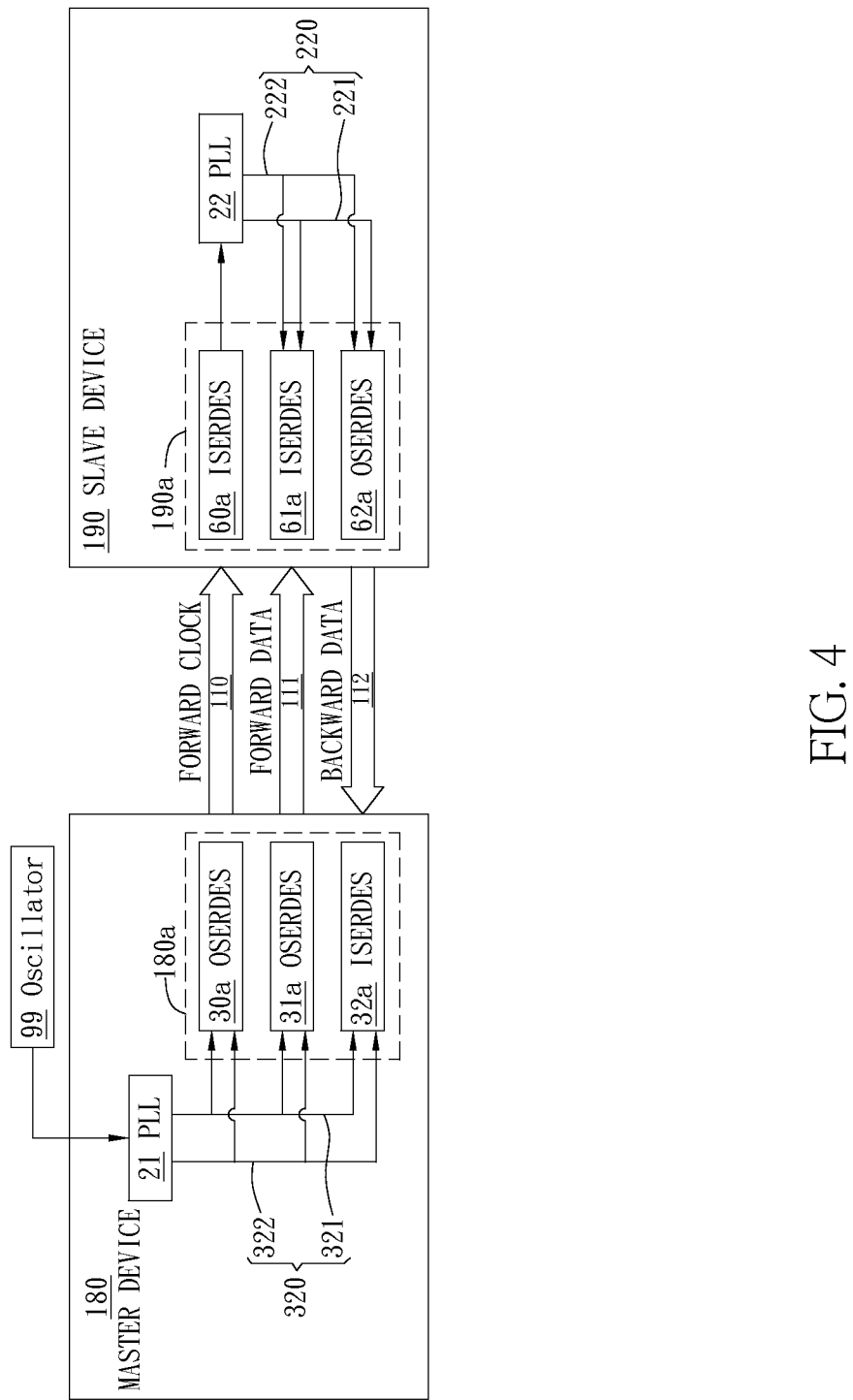
FIG. 4 illustrates a block diagram of the architecture of asymmetric duplex transmission according to another embodiment of the present invention.

Please refer to FIG. 4, which illustrates another embodiment of the present invention. The master device 180 comprises a first phase lock loop (PLL) 21 coupled to a master transceiver module 180a, and an oscillator 99 coupled to the first PLL 21. In one embodiment, the master transceiver module 180a can be a serializer/deserializer (SERDES) comprising output SERDES (OSERDES) 30a, and 31a, and input SERDES (ISERDES) 32a. Similarly, the slave transceiver module 190a in the slave device 190 comprises ISERDES 60a, and 61a, and OSERDES 62a. The OSERDES 30a performs as a serializer for transmitting the forward clock through the first transmission medium 110 to the ISERDES 60a, which performs as a deserializer for receiving the forward clock. The OSERDES 31a performs as a serializer to transmit the forward data through the second transmission medium 111 to the ISERDES 61a, which performs as a deserializer for receiving the forward data. The OSERDES 62a arranged within the slave device 190 performs as a serializer to transmit the backward data through third transmission medium 112 to the ISERDES 32a arranged within the master device 180, wherein the ISERDES 32a performs as a deserializer for receiving the backward data.

The first PLL 21 in the master device 180 provides the first clock 320 according to the clock signal generated from the oscillator 99 to trigger the OSERDES 30a and 31a, and the ISERDES 32a; the second PLL 22 in the slave device 190 provides the second clock 220 according to the received forward clock from the ISERDES 60a to trigger the ISERDES 61a and the OSERDES 62a. It is noted that, in this embodiment, the first clock 320 comprises an IO clock 322 and a base clock 321, wherein the IO clock 322 is several times higher in frequency than the base clock 321. In this embodiment, the IO clock 322 is eight times higher in frequency than the base clock 321. For example, if the base clock 321 is 50 MHz, the IO clock 322 will become 400 MHz. It should be noted that the eight times higher is only an exemplary embodiment for explaining the frequency difference between base clock and IO clock, which should not be a limitation of the present invention. Likewise, the second clock 220 also comprises an IO clock 222 and a base clock 221, wherein the IO clock 222 is higher in frequency than the base clock 221 (e.g., eight times higher), which is similar to the first clock, and will not be described hereinafter.

Figure 5:
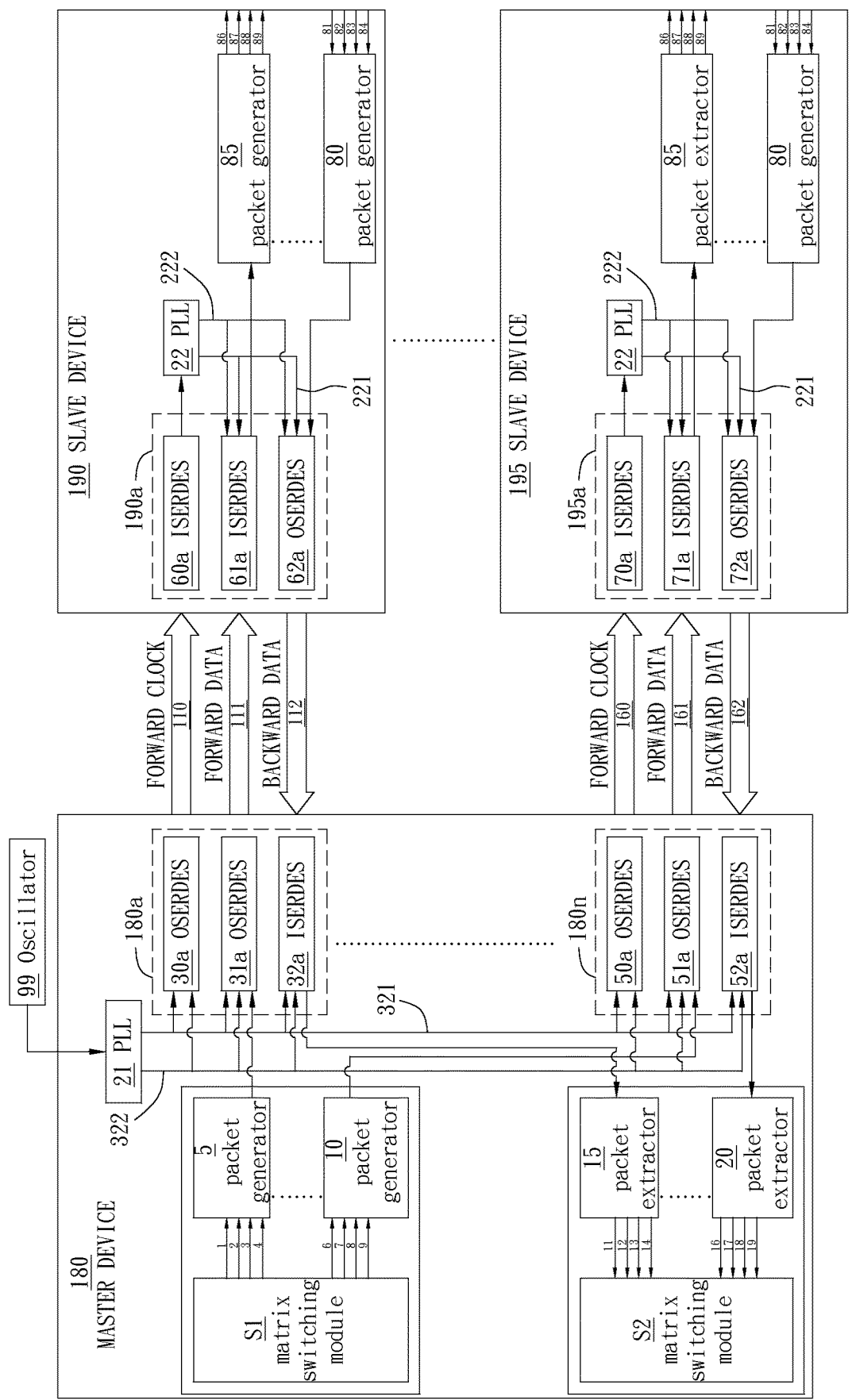
FIG. 5 illustrates a block diagram of the architecture of asymmetric duplex transmission according to a further embodiment of the present invention.

Please refer to FIG. 5, which illustrates another embodiment in the present invention. In FIG. 5, it provides a switching system employing the asymmetric duplex transmission device based on the embodiment shown in FIG. 2 and FIG. 4. The master device 180 illustrated herein is coupled to a plurality of slave devices which is representatively labeled as 190 and 195. The master device 180 comprises a plurality of master transceiver modules which is representatively labeled as 180a to 180n, and each of which is coupled to the first PLL 21. Each slave device is coupled to one master transceiver module. In the present embodiment, the slave device 190 is coupled to the master transceiver module 180a, and the slave device 195 is coupled to the master transceiver module 180n. The master transceiver module 180a comprises a first transmission module 30a, a second transmission module 31a and a first receiving module 32a; the slave transceiver module 190a comprises a second receiving module 60a, a third receiving module 61a and a third transmission module 62a. The first transmission module 30a is electrically coupled to the second receiving module 60a through a first transmission medium 110, the second transmission module 31a is electrically coupled to the third receiving module 61a through a second transmission medium 111, and the first receiving module 32a is electrically coupled to the third transmission module 62a through a third transmission medium 112. Similarly to the embodiment shown in FIG. 4, the first transmission module and the second transmission module arranged within the master transceiver module 180a can be OSERDESes 30a and 31a, and the first receiving module can be ISERDES 32a; the second receiving module 60a and the third receiving module 61a arranged within the slave transceiver module 190a can be ISERDESes and the third transmission module 62a can be an OSERDES. Likewise, the master transceiver module 180n comprises OSERDESes 50a, 51a, and ISERDES 52a, and the slave transceiver module 195a in the slave device 195 comprises ISERDESes 70a, 71a, and OSERDES 72a. The OSERDES 50a is electrically coupled to the ISERDES 70a through a first transmission medium 160, the OSERDES 51a is electrically coupled to the ISERDES 71a through a second transmission medium 161, and the ISERDES 52a is electrically coupled to the OSERDES 72a through a third transmission medium 162. The transmission medium 110~112 and 160~162 can be, but should not be limited to, the twisted wires, connectors or flexible circuit boards.

Please refer back to FIG. 5, the master device 180 further comprises a plurality of packet generators 5 and 10, and a plurality of packet extractors 15 and 20. The packet generators 5 and 10 are electrically coupled to a matrix switching module S1, wherein the number of the packet generators corresponds to the number of the master transceiver module. Each packet generator is coupled to one OSERDES for transmitting the forward data. For example, the packet generator 5 is electrically coupled to the OSERDES 31a and the packet generator 10 is electrically coupled to the OSERDES 51a. Each packet generator 5 or 10 receives a plurality of data streams 1~4 or 6~9 transmitted from the matrix switching module S1 and converts the plurality of data streams into a package data, and respectively transmits the package data to the OSERDES 31a or 51a. In one embodiment, the OSERDES 31a receives the package data, the IO clock 322 and the base clock 321 thereby generating the forward data and transmitting the forward data to the ISERDES 61*a* through the second transmission medium 111. Likewise, the OSERDES 51*a* receives the package data, the IO clock 322 and the base clock 321 thereby generating the forward data and transmitting the forward data to the ISERDES 71*a* through the second transmission medium 161. In this embodiment, the data stream may be a non-video data stream including a control data stream, audio data stream, data stream or the combination thereof. The control data stream can be, but should not be limited to, an IR data stream, UART data stream, or the combination thereof.

On the other hand, in the slave devices 190 and 195, in addition to the ISERDES 60*a*, 61*a*, 70*a*, and 71*a*, the OSERDES 62*a*, and 72*a*, and the second PLL 22, each slave device 190 or 195 further comprises a slave packet extractor 85, and a slave packet generator 80, wherein the slave packet extractor 85 receives the forward data from the ISERDES 61*a* and extracts the forward data thereby restoring the forward data into a plurality of data streams 86~89. The slave packet generator 80 receives a plurality of data streams 81~84 and converts the plurality of data streams 81~84 into packet data, which is further received by the OSERDES 62*a* as the backward data and is transmitted to the ISERDES 32*a* of the master device 180 through the third transmission medium 112. Likewise, in the slave device 195, the slave packet extractor 85 and the slave packet generator 80 are respectively coupled to the ISERDES 71*a* and OSERDES 72*a* and perform the same function as the slave packet extractor 85 and the slave packet generator 80 in the slave device 190, and the detailed descriptions will not be repeated here.

Please still refer to FIG. 5, the packet extractor 15 in the master device 180 is electrically coupled to the ISERDES 32*a* for receiving the backward data transmitted from the ISERDES 32*a*, converting the backward data into a plurality of data streams 11~14. The packet extractor 20 is electrically coupled to the ISERDERS 52*a* for receiving the backward data and converting the backward data into a plurality of data streams 16~19. The plurality of data streams 11~14, and 16~19 are transmitted to the matrix switching module S2 that can selectively output the extracted data streams 11~14, and 16~19 to a designated output.

It is also noted that since each slave device 190 or 195 does not transmit the backward clock while transmitting the backward data to the master device 180 and the first PLL 21 is commonly shared to the OSERDES 30*a*, 31*a*, 50*a*, and 51*a* and the ISERDES 32*a* and 52*a*, there will be a phase shift between the pulses of the first clock and the pulses of the backward data. A phase adjustment procedure can be used to make the rising edge of the first clock located near the middle of the high level of the backward data so as to ensure the correctness of receiving the backward data. According to the architecture in the embodiment, the first PLL 21 can provide the clock that is used by the master device 180 when transmitting the forward clock, the forward data and receiving the backward data. Accordingly, there only needs one PLL when the master device transmits data to a plurality of slave devices.

Figure 6:
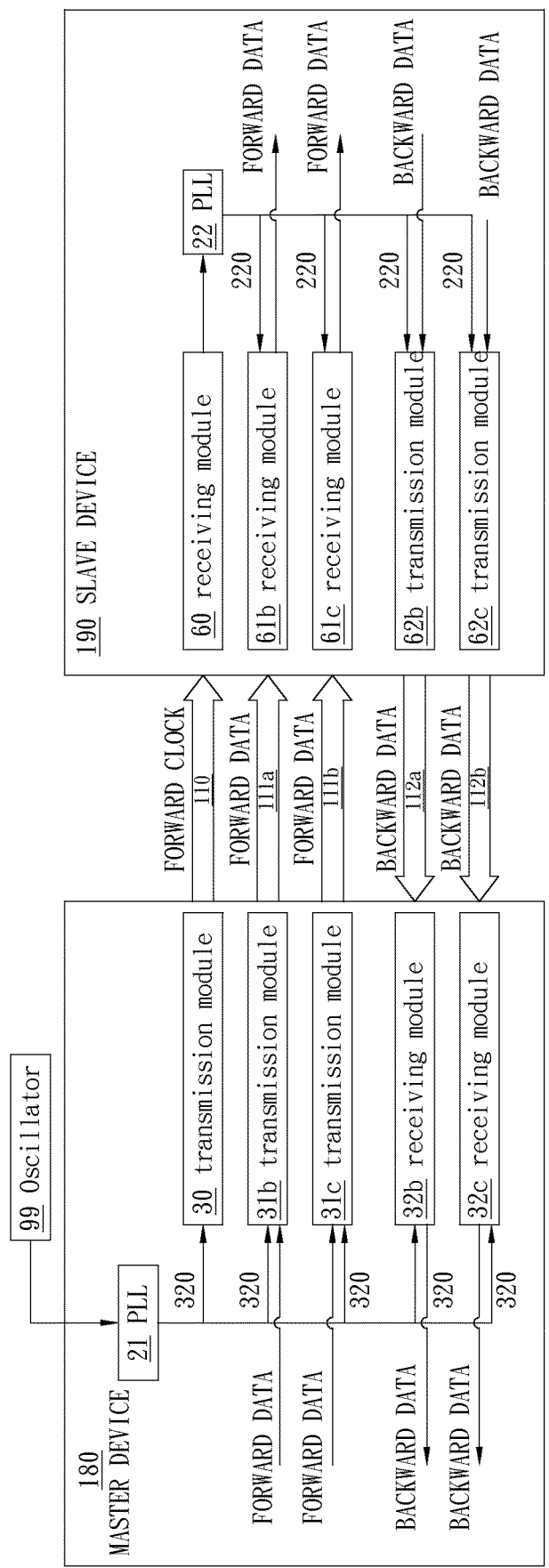
FIG. 6 illustrates another embodiment of asymmetric duplex transmission architecture according to the present invention.

It is noted that although there has only one transmission medium for transmitting each data (the forward data or the backward data) between the master device and slave device, there are other alternatives where the forward data or backward data is each transmitted through a plurality of transmission medium. For example, in the embodiment shown in FIG. 6, there are two transmission media 111*a* and 111*b* for transmitting the forward data from transmission modules 31*b* and 31*c* of master device to the receiving modules 61*b* and 61*c* of slave device, respectively; there are two transmission media 112*a* and 112*b* for transmitting backward data from the transmission modules 62*b* and 62*c* of slave device to the receiving modules 32*b* and 32*c*, respectively. The transmission modules 30, 31*b*, 31*c*, 62*b* and 62*c* can be, but should not be not limited to, the OSERDES; the receiving modules 32*b*, 32*c*, 60, 61*b* and 61*c* can be, but should not be limited to, the ISERDES. The rest of this embodiment is similar to the embodiments mentioned above, and will not be described in detail hereinafter.

Compared to the conventional technology, there is only one PLL needed when the master device and the slave device transmit data in the present invention. The master device and the slave device communicate with each other through a single clock and full duplex data channels. It can also switch the duplex data channels between a plurality of slave devices under limited resources. In the practice situation, the complexity of circuit layout can be reduced thereby saving the cost and time requirement of development.

Although the preferred embodiments of the present invention have been described herein, the above description is merely illustrative. Further modification of the invention herein disclosed will occur to those skilled in the respective arts and all such modifications are deemed to be within the scope of the invention as defined by the appended claims.

What is claimed is:

1. An asymmetric duplex transmission device, comprising:
   a master device, comprising an oscillator, a first phase lock loop coupled to the oscillator and a master transceiver module coupled to the first phase lock loop; and
   at least one slave device coupled to the master device, each slave device comprising a slave transceiver module;
   wherein the master transceiver module transmits a forward clock to the slave transceiver module through a first transmission medium, transmits a forward data to the slave transceiver module through a second transmission medium, and receives a backward data transmitted from the slave transceiver module through a third transmission medium, without receiving any backward clock from the slave transceiver module, wherein each of the forward data transmitted by the master transceiver module to the slave transceiver module, the forward clock transmitted by the master transceiver module to the slave transceiver module, and the backward data transmitted by the slave transceiver module and received by the master transceiver module is a serial data, and wherein the forward clock and the forward data are transmitted separately to the slave transceiver module; and
   wherein the first phase lock loop provides a first clock according to a clock signal generated by the oscillator, the first clock being used by the master transceiver module to transmit the forward clock and the forward data to the at least one slave device, and the first clock being used by the master transceiver module to receive the serial backward data from the at least one slave device.

2. The asymmetric duplex transmission device of claim 1, wherein the master transceiver module comprises:
   a first transmission module coupled to the first transmission medium;
   a second transmission module coupled to the second transmission medium; and a first receiving module coupled to the third transmission medium; and wherein the slave transceiver module comprises:
a second receiving module coupled to the first transmission medium;
a third receiving module coupled to the second transmission medium; and
a third transmission module coupled to the third transmission medium.

3. The asymmetric duplex transmission device of claim 1, wherein the slave device further comprises a second phase lock loop coupled to the slave transceiver module, wherein the second phase lock loop provides a second clock based on the forward clock received from the master device, and wherein the second clock is used when the slave transceiver module receives the forward data and transmits the backward data.

4. The asymmetric duplex transmission device of claim 1, wherein each of the master transceiver module and the slave transceiver module is a serializer/deserializer.

5. The asymmetric duplex transmission device of claim 3, wherein each of the first clock and the second clock comprises an input/output (TO) clock and a base clock.

6. The asymmetric duplex transmission device of claim 1, wherein each of the forward clock, the forward data and the backward data is a differential signal.

7. The asymmetric duplex transmission device of claim 1, wherein the master transceiver module further adjusts a phase of the backward data according to a phase of the first clock.

8. A switching system employing an asymmetric duplex transmission device, comprising:
a master device, comprising:
an oscillator;
a first phase lock loop coupled to the oscillator;
at least one packet generator, each packet generator outputting at least one package data;
a matrix switching module coupled to the packet generator, the matrix switching module transmitting at least one data stream to the packet generator to be converted into the package data; and
at least one master transceiver module, each coupled to the first phase lock loop and one of the at least one packet generator, each master transceiver module converting the package data into the forward data; and
at least one slave device, each of which is coupled to one of the master transceiver modules and has a slave transceiver module;
wherein the master transceiver module transmits a forward clock to the slave transceiver module through a first transmission medium, transmits a forward data to the slave transceiver module through a second transmission medium, and receives a backward data transmitted from the slave transceiver module through a third transmission medium, without receiving any backward clock from the slave transceiver module, wherein each of the forward data transmitted by the master transceiver module to the slave transceiver module, the forward clock transmitted by the master transceiver module to the slave transceiver module, and the backward data transmitted by the slave transceiver module and received by the master transceiver module is a serial data, and wherein the forward clock and the forward data are transmitted separately to the slave transceiver module; and wherein the first phase lock loop provides a first clock according to a clock signal generated by the oscillator, the first clock being used by the master transceiver module to transmit the forward clock and the forward data to the at least one slave device, and the first clock being used by the master transceiver module to receive the serial backward data from the at least one slave device.

9. The switching system of claim 8, wherein the master transceiver module further comprises:
a first transmission module coupled to the first transmission medium;
a second transmission module coupled to the second transmission medium; and
a first receiving module coupled to the third transmission medium; and
wherein the slave transceiver module further comprises:
a second receiving module coupled to the first transmission medium;
a third receiving module coupled to the second transmission medium; and
a third transmission module coupled to the third transmission medium.

10. The switching system of claim 8, wherein the master device further comprises:
at least one packet extractor each coupled to one of the at least one master transceiver module, each packet extractor receiving the backward data transmitted from the master transceiver module, and converting the backward data into a plurality of data streams and transmitting them to the matrix switching module, and
wherein each slave device further comprises a slave packet generator and a slave packet extractor, wherein the slave packet generator converts at least one backward data stream into the backward package data and transmits the backward package data to the slave transceiver module, and the slave packet extractor receives at least one forward package data from the slave receiver module and converts the at least one package data to the at least one data stream.

11. The switching system of claim 8, wherein the slave device further comprises a second phase lock loop coupled to the slave transceiver module, wherein the second phase lock loop provides a second clock based on the forward clock received from the master device, and wherein the second clock is used when the slave transceiver module receives the forward data and transmits the backward data.

12. The switching system of claim 8, wherein each of the master transceiver module and the slave transceiver module is a serializer/deserializer.

13. The switching system of claim 11, wherein each of the first clock and the second clock comprises an input/output (TO) clock and a base clock.

14. The switching system of claim 8, wherein each of the forward clock, the forward data and the backward data is a differential signal.

15. The switching system of claim 8, wherein the master transceiver module further adjusts a phase of the backward data according to a phase of the first clock.

16. A method implemented in an asymmetric duplex transmission system having a master device and a slave device coupled to each other by a plurality of transmission media, the method comprising:
a phase lock loop of the master device generating a first clock according to a clock signal generated by an oscillator;

a master transceiver module of the master device transmitting a forward clock to the slave device through a first transmission medium using the first clock, and transmitting a forward data to the slave device through a second transmission medium using the first clock, wherein each of the forward data transmitted by the master transceiver module to the slave transceiver module and the forward clock transmitted by the master transceiver module to the slave transceiver module is a serial data, and wherein the forward clock and the forward data are transmitted separately to the slave transceiver module; and the master transceiver module receiving a backward data from the slave device through a third transmission medium using the first clock, without receiving any backward clock from the slave transceiver module, wherein the backward data received by the master transceiver module from the slave transceiver module is a serial data.

17. The method of claim 16, further comprising:

a phase lock loop of the slave device generating a second clock based on the forward clock received from the master device through the first transmission medium;

a slave transceiver module of the slave device receiving the forward data from the master device through the second transmission medium using the second clock; and the slave transceiver module transmitting the backward data to the master device through the third transmission medium using the second clock.

18. The method of claim 16, further comprising: the master transceiver module adjusting a phase of the backward data according to a phase of the first clock.

* * * * *